(12) United States Patent
Liu et al.

(10) Patent No.: US 10,002,555 B2
(45) Date of Patent: Jun. 19, 2018

(54) DISPLAY APPARATUS AND DIPSLAY METHOD

(71) Applicant: Young Lighting Technology Inc., Hsin-Chu (TW)

(72) Inventors: Chin-Ku Liu, Hsin-Chu (TW); Jhong-Hao Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 108 days.

(21) Appl. No.: 15/051,666

(22) Filed: Feb. 24, 2016

(65) Prior Publication Data
US 2016/0267860 A1 Sep. 15, 2016

(30) Foreign Application Priority Data
Mar. 12, 2015 (CN) .......................... 2015 1 0107575

(51) Int. Cl.
*G09G 3/20* (2006.01)
*G09G 3/32* (2016.01)
*G09G 3/36* (2006.01)

(52) U.S. Cl.
CPC .................. *G09G 3/20* (2013.01); *G09G 3/32* (2013.01); *G09G 3/36* (2013.01); *G02F 2201/44* (2013.01); *G09G 2300/02* (2013.01); *G09G 2300/026* (2013.01); *G09G 2310/0232* (2013.01); *G09G 2320/0233* (2013.01)

(58) Field of Classification Search
CPC .......... G09G 3/3607; G09G 5/10; G09G 3/20; G02F 1/13306
See application file for complete search history.

(56) References Cited

U.S. PATENT DOCUMENTS

| | | | |
|---|---|---|---|
| 2005/0069201 A1* | 3/2005 | Speigle | H04N 1/6077 382/167 |
| 2008/0129933 A1 | 6/2008 | Nishida et al. | |
| 2011/0255301 A1* | 10/2011 | Watanabe | G02F 1/13336 362/558 |
| 2012/0281289 A1 | 11/2012 | Itoh et al. | |
| 2013/0265348 A1* | 10/2013 | Onogi | G09G 5/10 345/691 |

(Continued)

FOREIGN PATENT DOCUMENTS

| | | |
|---|---|---|
| CN | 1208668 | 6/2005 |
| CN | 101206848 | 7/2010 |

(Continued)

*Primary Examiner* — Kent Chang
*Assistant Examiner* — Scott Au
(74) *Attorney, Agent, or Firm* — JCIPRNET

(57) ABSTRACT

A display apparatus and a display method are disclosed. The display apparatus includes at least one display unit and a control unit. The display unit includes a liquid crystal display (LCD) module and a self-luminous display module. The self-luminous display module is disposed on an edge of the LCD module. The control unit is electrically connected to the LCD module and the self-luminous display module, and matches optical parameters of the LCD module with optical parameters of the self-luminous display module. The display apparatus makes an effective use of a frame region of the LCD module for displaying, and maintains the characteristic of the LCD module, and the display method matches display effects of the LCD module and the self-luminous display module.

28 Claims, 6 Drawing Sheets

(56) References Cited

U.S. PATENT DOCUMENTS

| | | | |
|---|---|---|---|
| 2014/0132539 A1* | 5/2014 | Huang | G06F 1/1643 345/173 |
| 2014/0198316 A1* | 7/2014 | Chen | G09G 3/006 356/448 |
| 2014/0343308 A1 | 11/2014 | Rizkalla et al. | |
| 2016/0139442 A1* | 5/2016 | Li | G02F 1/133308 349/12 |
| 2016/0266437 A1 | 9/2016 | Liu et al. | |

FOREIGN PATENT DOCUMENTS

| | | |
|---|---|---|
| CN | 102137244 | 7/2011 |
| CN | 103150970 | 6/2013 |
| TW | 561278 | 11/2003 |

* cited by examiner

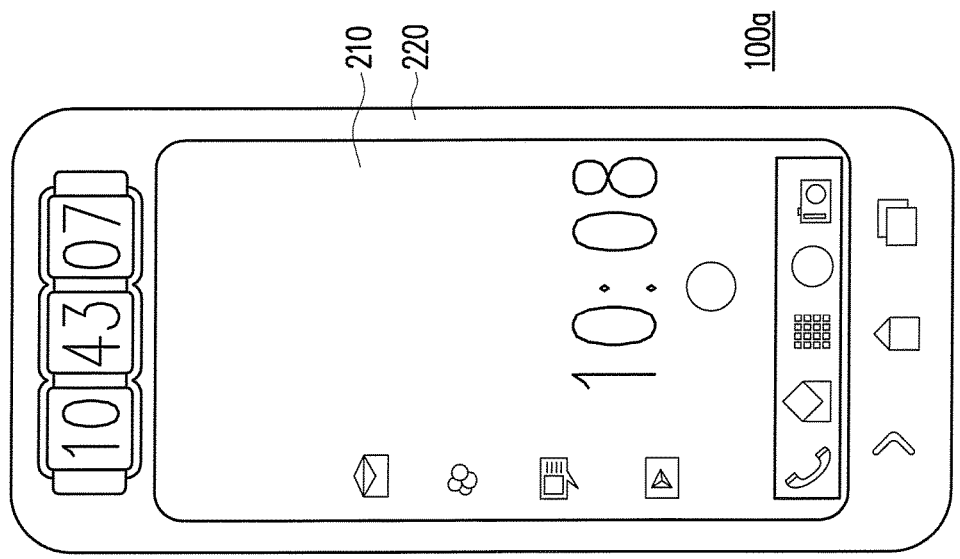

DISPLAY APPARATUS AND DIPSLAY METHOD

CROSS-REFERENCE TO RELATED APPLICATION

This application claims the priority benefit of China application serial no. 201510107575.8, filed on Mar. 12, 2015. The entirety of the above-mentioned patent application is hereby incorporated by reference herein and made a part of this specification.

BACKGROUND OF THE INVENTION

Field of the Invention

The invention relates to a display apparatus and a display method.

Description of Related Art

Large screen display system is widely applied in control rooms of a plurality of domains such as telecommunication network management, public security police direct, traffic monitoring and management, military combat and training direct, industrial production scheduling, etc. The large screen display system can display signals of different signal sources in centralization, so as to meet user's demand for displaying a variety of sharing information and synthetic information in a large area. A commonly used large screen splicing television (TV) wall system is generally grouped into a liquid crystal display (LCD) splicing TV wall or a light-emitting diode (LED) splicing TV wall according to a working method of display units thereof.

In view of the so-called LCD splicing TV wall, a plurality of LCD display units are spliced, and a splicing control software system is used to implement a large screen display effect. The LCD splicing TV wall has advantages of thin thickness, light weight, low power consumption, long service life, no irradiation, exquisite display image, high resolution, and due to excellent performance of various key performance indicators, it has become a mainstream of development, and has a good prospect. Although the LCD has the aforementioned advantages, when the LCDs are used as the display units of the splicing TV wall, limited by an invalid area of the LCD panel and a front frame mechanism, a splicing gap of the LCDs is relatively large.

In view of the so-called LED splicing TV wall, the LED splicing TV wall is formed by splicing a plurality of LEDs to serve as the display units, in which an active light-emitting property and a small pitch technique of the LEDs are used to support a high resolution display. The LED display unit does not contain hazardous substances such as mercury, infrared, ultraviolet, etc., and has a high efficiency in energy saving, and a service life thereof is up to 100,000 hours (8-10 years), which is superior to the service life of 5-6 years of the LCD display unit. However, the biggest problems of the LED splicing TV wall are resolution and cost. Limited by a package size of the LEDs and due to a circuit limitation, a pitch of the currently mass-produced smallest LEDs is generally larger than a pitch of the LCD pixels. When a display size is excessively small, it probably unable to reach a high resolution by using the LEDs.

Moreover, when each LED is used as a display pixel, taking a resolution of 1920×1080 as an example, at least 2,000,000 LEDs are required, and each LED contains RGB light-emitting chips. Namely, totally 2,000,000 red light-emitting chips, 2,000,000 green light-emitting chips and 2,00,000 blue light-emitting chips are required, which leads to a high cost.

The information disclosed in the "BACKGROUND OF THE INVENTION" section is only for enhancement of understanding of the background of the described technology, and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a display apparatus, which has a characteristic of a liquid crystal display (LCD) module, and is able to make an effective use of a frame region of the LCD module to display, and matches display effects of the LCD module and a self-luminous display module.

The invention is directed to a display method, by which display effects of an LCD module and a self-luminous display module are matched.

Other objects and advantages of the invention can be further illustrated by the technical features broadly embodied and described as follows.

In order to achieve one or a portion of or all of the objects or other objects, an embodiment of the invention provides a display apparatus including at least one display unit and a control unit. The display unit includes a liquid crystal display (LCD) module and a self-luminous display module. The self-luminous display module is disposed on an edge of the LCD module. The control unit is electrically connected to the LCD module and the self-luminous display module, and matches optical parameters of the LCD module with optical parameters of the self-luminous display module.

In an embodiment of the invention, the self-luminous display module includes a plurality of light-emitting units arranged in an array, and the optical parameters of the LCD module and the optical parameters of the self-luminous display module respectively include a position and a size of a light-emitting region. The control unit turns on a part of pixels of the LCD module to form a plurality of bright regions arranged in an array and separated from each other, and the control unit turns off the other part of the pixels of the LCD module to form a dark region.

In an embodiment of the invention, a pitch of the bright regions is substantially equal to a pitch of the light-emitting units.

In an embodiment of the invention, each of the light-emitting units is a light-emitting diode.

In an embodiment of the invention, each of the bright regions is composed of a plurality of turned-on pixels in the LCD module, and a width of the light-emitting region of each of the light-emitting units is substantially equal to a width of each of the bright regions.

In an embodiment of the invention, a width of the dark region between any two adjacent bright regions is substantially equal to an interval between any two adjacent light-emitting units.

In an embodiment of the invention, an interval between a bright region and a light-emitting unit adjacent to each other along a direction parallel to a display surface of the LCD module is substantially equal to an interval between two adjacent light-emitting units, and is substantially equal to an interval between two adjacent bright regions.

In an embodiment of the invention, the optical parameters of the LCD module and the optical parameters of the self-luminous display module respectively include a maximum display light intensity, and the control unit adjusts a light intensity of at least one of the LCD module and the self-luminous display module, such that the maximum display light intensity of the LCD module is substantially equal to the maximum display light intensity of the self-luminous display module.

In an embodiment of the invention, the optical parameters of the LCD module and the optical parameters of the self-luminous display module respectively include a color gamut, and the control unit adjusts the color gamut of at least one of the LCD module and the self-luminous display module, such that the color gamut of the LCD module is substantially equal to the color gamut of the self-luminous display module.

In an embodiment of the invention, an original color gamut of the self-luminous display module is greater than an original color gamut of the LCD module, and the control unit decreases the color gamut of the self-luminous display module. The self-luminous display module includes a plurality of pixels arranged in an array, each pixel includes a light-emitting unit having a different color, and the control unit decreases the color gamut of the self-luminous display module by increasing a gray level of a color value of at least one color other than that with a color value corresponding to a maximum gray level in each of the pixels.

In an embodiment of the invention, an original color gamut of the self-luminous display module is greater than an original color gamut of the LCD module, the control unit decreases the color gamut of the self-luminous display module, and the self-luminous display module includes a plurality of pixels arranged in an array. Each pixel includes a plurality of light-emitting units of different colors, and the control unit decreases the color gamut of the self-luminous display module by increasing a gray level of the light-emitting unit of at least one color other than that of the light-emitting unit with a maximum gray level in each of the pixels.

In an embodiment of the invention, the LCD module includes a LCD panel and a frame. The frame covers an edge of the LCD panel, and the self-luminous display module is disposed on the frame.

In an embodiment of the invention, the self-luminous display module includes a plurality of light-emitting diodes arranged in an array.

In an embodiment of the invention, the at least one display unit includes a plurality of display units, and the display units are spliced into the display apparatus, and the self-luminous display modules of any two adjacent display units are connected to each other.

In an embodiment of the invention, the control unit is configured to match optical parameters of the display units.

In an embodiment of the invention, the self-luminous display module covers the edge of the LCD module, and surrounds a display region of the LCD module.

In an embodiment of the invention, the maximum display light intensity of the LCD module is smaller than the maximum display light intensity of the self-luminous display module, and the display unit further includes a light-shielding plate, the light-shielding plate is disposed on the self-luminous display module to decrease the maximum display light intensity of the self-luminous display module.

In order to achieve one or a portion of or all of the objects or other objects, an embodiment of the invention provides a display method including following steps. At least one display unit is provided, where the display unit includes an LCD module and a self-luminous display module disposed on an edge of the LCD module. The LCD module and the self-luminous display module are driven to display an image, and optical parameters of the LCD module and optical parameters of the self-luminous display module are matched.

In an embodiment of the invention, the self-luminous display module includes a plurality of light-emitting units arranged in an array, and the optical parameters of the LCD module and the optical parameters of the self-luminous display module respectively include a position and a size of a light-emitting region. The step of matching the optical parameters of the LCD module and the optical parameters of the self-luminous display module includes turning on a part of pixels of the LCD module to form a plurality of bright regions arranged in an array and separated from each other, and turning off the other part of the pixels of the LCD module to form a dark region.

In an embodiment of the invention, a pitch of the bright regions is substantially equal to a pitch of the light-emitting units.

In an embodiment of the invention, each of the bright regions is composed of a plurality of turned-on pixels in the LCD module, and a width of the light-emitting region of each of the light-emitting units is substantially equal to a width of each of the bright regions.

In an embodiment of the invention, a width of the dark region between any two adjacent bright regions is substantially equal to an interval between any two adjacent light-emitting units.

In an embodiment of the invention, an interval between a bright region and a light-emitting unit adjacent to each other along a direction parallel to a display surface of the LCD module is substantially equal to an interval between two adjacent light-emitting units, and is substantially equal to an interval between two adjacent bright regions.

In an embodiment of the invention, the optical parameters of the LCD module and the optical parameters of the self-luminous display module respectively include a maximum display light intensity, and the step of matching the optical parameters of the LCD module and the optical parameters of the self-luminous display module includes adjusting a light intensity of at least one of the LCD module and the self-luminous display module, such that the maximum display light intensity of the LCD module is substantially equal to the maximum display light intensity of the self-luminous display module.

In an embodiment of the invention, the optical parameters of the LCD module and the optical parameters of the self-luminous display module respectively include a color gamut, and the step of matching the optical parameters of the LCD module and the optical parameters of the self-luminous display module includes adjusting the color gamut of at least one of the LCD module and the self-luminous display module, such that the color gamut of the LCD module is substantially equal to the color gamut of the self-luminous display module.

In an embodiment of the invention, an original color gamut of the self-luminous display module is greater than an original color gamut of the LCD module, the self-luminous display module includes a plurality of pixels arranged in an array, and each pixel includes a light-emitting unit having a different color. The step of decreasing the color gamut of at least one of the LCD module and the self-luminous display module includes increasing a gray level of a color value of at least one color other than that with a color value corresponding to a maximum gray level in each of the pixels, so as to decrease the color gamut of the self-luminous display module.

In an embodiment of the invention, an original color gamut of the self-luminous display module is greater than an original color gamut of the LCD module, the self-luminous display module includes a plurality of pixels arranged in an array, and each pixel includes a plurality of light-emitting units of different colors, and the step of decreasing the color gamut of at least one of the LCD module and the self-luminous display module includes increasing a gray level of the light-emitting unit of at least one color other than that of the light-emitting unit with a maximum gray level in each of the pixels, so as to decrease the color gamut of the self-luminous display module.

In an embodiment of the invention, the at least one display unit includes a plurality of display units, and the display method includes splicing the display units into a display apparatus, and making the self-luminous display modules of any two adjacent display units connect each other.

In an embodiment of the invention, the display method further includes matching optical parameters of the display units.

In an embodiment of the invention, the maximum display light intensity of the LCD module is smaller than the maximum display light intensity of the self-luminous display module, and the display method further includes disposing a light-shielding plate on the self-luminous display module to decrease the maximum display light intensity of the self-luminous display module.

The embodiments of the invention have at least one of the following advantages and effects. In the display apparatus and the display method according to the embodiments of the invention, since a design of disposing the self-luminous display module on the edge of the LCD module is adopted, the edge region of the LCD module is effectively used for displaying, and the characteristic of the LCD module is maintained. Moreover, since the optical parameters of the LCD module and the optical parameters of the self-luminous display module are matched, the display effect of the LCD module is close to the display effect of the self-luminous display module, such that the display effects of the LCD module and the self-luminous display module are matched.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a front view of a display apparatus according to another embodiment of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
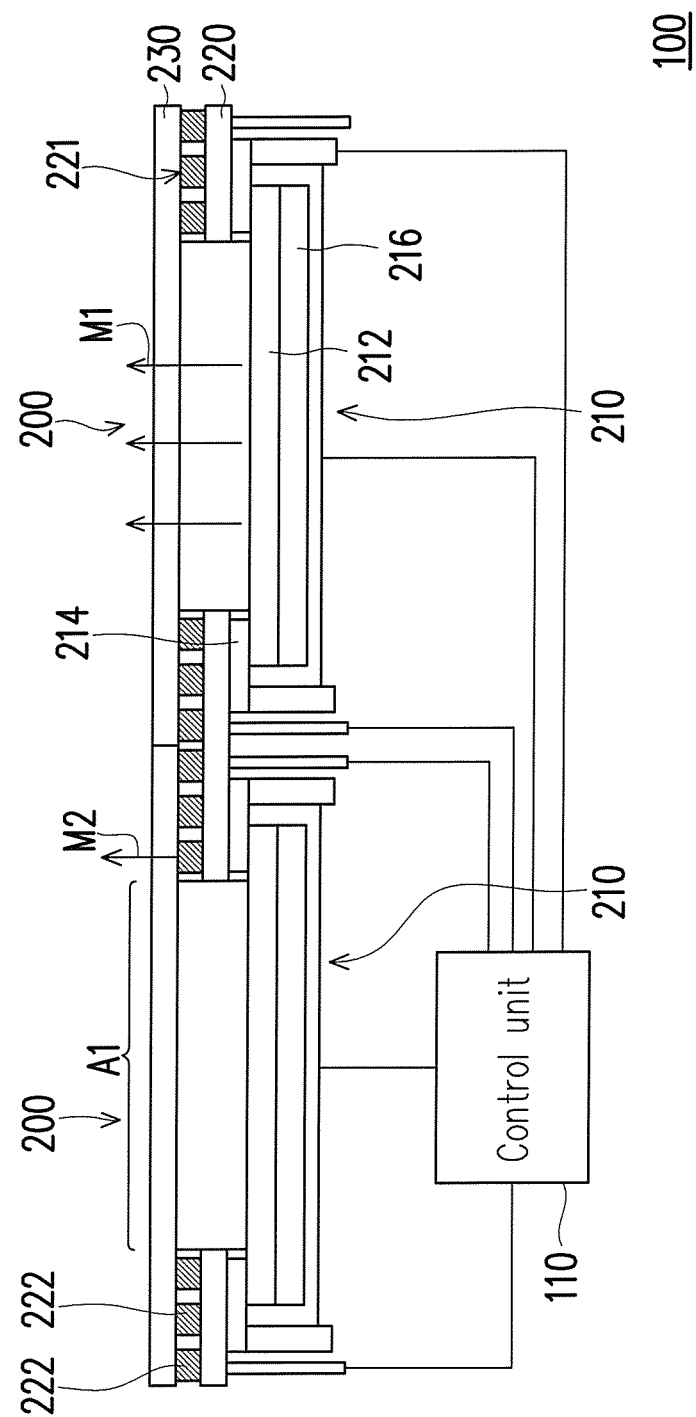
FIG. 1A is a cross-sectional view of a display apparatus according to an embodiment of the invention.
Figure 1C:
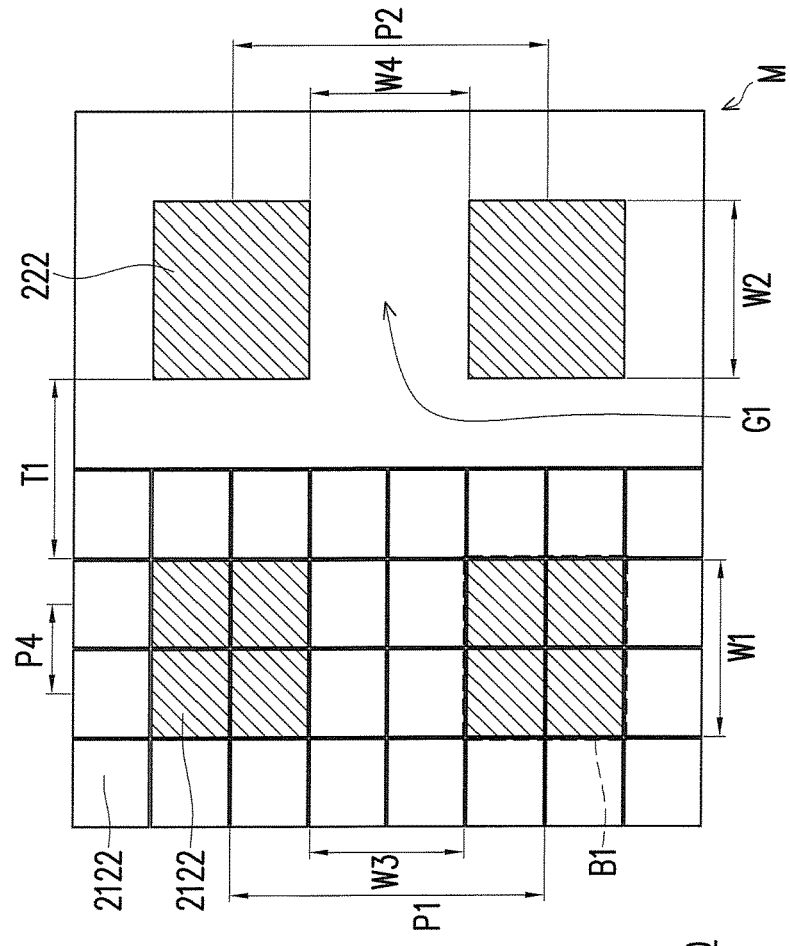
FIG. 1C is a partial enlarged view of a region M of the display apparatus of FIG. 1B.
Figure 1B:
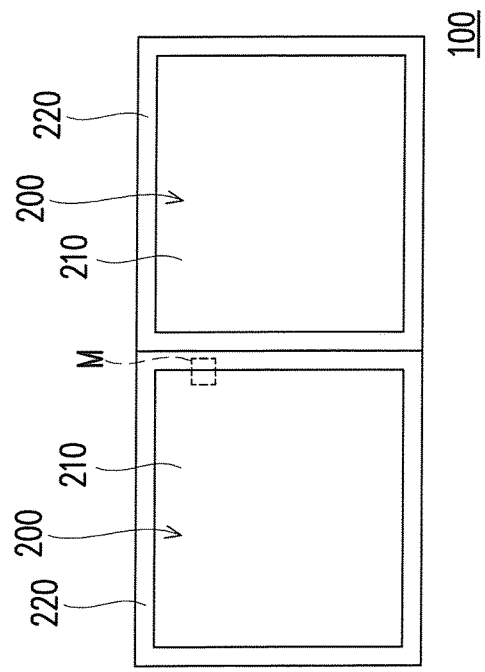
FIG. 1B is a front view of the display apparatus of FIG. 1A.

FIG. 1A is a cross-sectional view of a display apparatus according to an embodiment of the invention. FIG. 1B is a front view of the display apparatus of FIG. 1A, and FIG. 1C is a partial enlarged view of a region M of the display apparatus of FIG. 1B. Referring to FIG. 1A, FIG. 1B and FIG. 1C, the display apparatus 100 of the embodiment includes at least one display unit 200 (in FIG. 1, a plurality of display units 200 are illustrated). The display unit 200 includes a liquid crystal display (LCD) module 210 and a self-luminous display module 220. The self-luminous display module 220 is disposed on an edge of the LCD module 210. In the embodiment, the LCD module 210 includes a LCD panel 212 and a frame 214. The frame 214 covers an edge of the LCD panel 212, and the frame 214 exposes a display region A1 of the LCD module 210. The self-luminous display module 220 is disposed on the frame 214, i.e., the self-luminous display module 220 is disposed on a non-display region (which is not indicated) of the LCD module 210. In the embodiment, the self-luminous display module 220 includes a plurality of light-emitting units 222 arranged in an array, where the light-emitting units 222 are, for example, light-emitting diodes (LEDs). Further, each of the LEDs is, for example, formed by packaging a red light-emitting chip, a green light-emitting chip, a blue light-emitting chip, though the invention is not limited thereto. In other embodiments, the LEDs, for example, includes red LEDs, green LEDs and blue LEDs.

In the embodiment, the display units 200 are spliced into the display apparatus 100, and the self-luminous display modules 220 of any two adjacent display units 200 are connected to each other. Moreover, in the embodiment, the self-luminous display module 220 covers the edge of the LCD module 210, and surrounds the display region A1 of the LCD module 210.

In the display apparatus 100 of the embodiment, since the self-luminous display module 220 is capable of displaying images, by disposing the self-luminous display module 220 capable of displaying images on the edge (for example, the frame 214) of the LCD module 210, the edge region (for example, the frame region) of the LCD module 210 is effectively used for display, and the characteristic of the LCD module 210 is maintained. In detail, by adopting the design of disposing the self-luminous display module 220 on the frame 214, a problem that the frame 214 of the LCD module 210 cannot display image is effectively resolved. Moreover, the display region A1 within the frame 214 can still implement display through pixels of the LCD module 210, i.e., compared to the self-luminous display module 220, a display pattern with a low cost can be used for displaying. Moreover, when it is required to display a high resolution image in the display region A1, by using the display pattern of the LCD module 210, the effects of low cost and high resolution can be simultaneously achieved.

In the embodiment, the LCD module 210 further includes a backlight module 216, where the light emitted by the backlight module 216 forms an image beam M1 after passing through the LCD panel 212.

In the embodiment, the display unit 200 further includes a light transparent cover 230 made of, for example, a glass material or a plastic material. The light transparent cover 230 covers the self-luminous display module 220 and the LCD module 210 to protect the LCD module 210 and the self-luminous display module 220.

FIG. 2 is a front view of a display apparatus according to another embodiment of the invention. Referring to FIG. 2, the display apparatus 100a of the embodiment is similar to the display apparatus 100 of FIG. 1B, and differences therebetween are as follows. The display apparatus 100a of the embodiment can serve as a screen of an electronic device, where the electronic device is, for example, a smart phone or a tablet personal computer (PC) or a personal digital assistant (PDA), though the invention is not limited thereto. In the embodiment, the LCD 210 is used for displaying delicate images with a high resolution, and the self-luminous display module 220 is used for displaying images or texts with less requirement on resolution such as key icons, time, reminder messages, etc.

A display method of the aforementioned display apparatus is introduced below with reference of the display apparatus of FIG. 1A to FIG. 1C.

Referring to FIG. 1A to FIG. 1C, the display apparatus 100 further includes a control unit 110. The control unit 110 is electrically connected to the LCD module 210 and the self-luminous display module 220, and matches optical parameters of the LCD module 210 with optical parameters of the self-luminous display module 220.

In the embodiment, the self-luminous display module 220 includes a plurality of light-emitting units 222 arranged in an array. The optical parameters of the LCD module 210 and the optical parameters of the self-luminous display module 220 respectively include a position and a size of a light-emitting region. In detail, the control unit 110 turns on a part of pixels 2122 (for example, the pixels 2122 indicated by slashes in FIG. 1C) of the LCD module 210 to form a plurality of bright regions B1 arranged in an array and separated from each other, so as to simulate the light-emitting units 222 of the self-luminous display module 220. The control unit 110 turns off the other part of pixels 2122 (for example, the pixels 2122 indicated by blank square in FIG. 1C) of the LCD module 210 to form a dark region, so as to simulate a gap G1 between the light-emitting units 222 of the self-luminous display module 220.

In the embodiment, each of the light-emitting units 222 is a light-emitting diode, and a pitch P1 of the bright regions B1 is substantially equal to a pitch P2 of the light-emitting units 222.

In the embodiment, each of the bright regions B1 is composed of a plurality of turned-on pixels 2122 (for example, four turned-on pixels 2122 formed one bright region B1 is illustrated) in the LCD module 210, and a width W2 of a light-emitting region (i.e., the slashed part of the light-emitting unit 222 in FIG. 1C) of each of the light-emitting units 222 is substantially equal to a width W1 of each bright region B1. Moreover, in the embodiment, a width W3 of the dark region between any two adjacent bright regions B1 is substantially equal to an interval W4 between any two adjacent light-emitting units 222.

In addition, in the embodiment, an interval T1 between the bright region B1 and the light-emitting unit 222 adjacent to each other along a direction parallel to a display surface of the LCD module 210 is substantially equal to the interval W4 between two adjacent light-emitting units 222, and is substantially equal to an interval (which is equivalent to the width W3) between two adjacent bright regions B1.

In the embodiment, each of the light-emitting units 222 is, for example, an LED formed by packaging a red light-emitting chip, a green light-emitting chip, a blue light-emitting chip, so that the light-emitting region of each of the light-emitting units 222 is, for example, a display pixel of the self-luminous display module 220, i.e., each pixel of the self-luminous display module 220 includes a light-emitting unit of a different color. Since the bright region B1 of the LCD module 210 is consistent with the light-emitting region of each of the light-emitting units 222 of the self-luminous display module 220, in other words, the display pixels of the LCD module 210 are consistent with the display pixels of the self-luminous display module 220, the resolutions of the images provided by the LCD module 210 and the self-luminous display module 220 are consistent and evenly distributed, such that a user cannot identify a difference between display effects of the LCD module 210 and the self-luminous display module 220.

Figure 3:
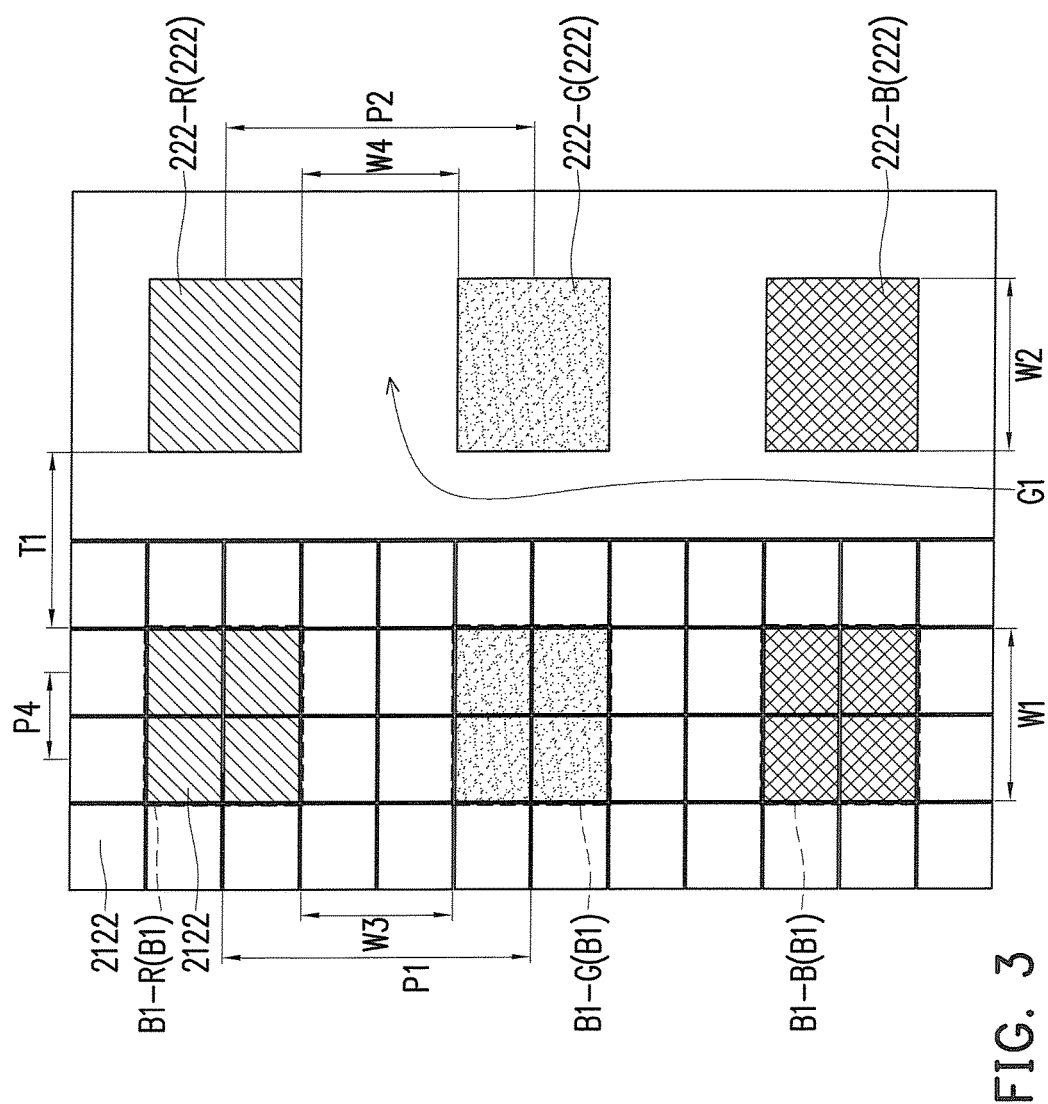
FIG. 3 is a partial enlarged view of a display apparatus according to another embodiment of the invention.

In other embodiments, as shown in FIG. 3, the embodiment of FIG. 3 is similar to the embodiment of FIG. 1C, and differences therebetween are as follows. Each of the light-emitting units 222 is an LED, and the LEDs, for example, include red LEDs, green LEDs and blue LEDs, so that the light-emitting region of each of the light-emitting units 222 is, for example, a sub display pixel of the self-luminous display module 220. In other words, each pixel of the self-luminous display module 220 includes a plurality of light-emitting units 222 of different colors. For example, in FIG. 3, a light-emitting unit 222-R of the self-luminous display module 220 is a red LED, a light-emitting unit 222-G is a green LED, and a light-emitting unit 222-B is a blue LED, and all pixels 2122 in the bright region B1-R of the LCD module 210 display a red color, all pixels 2122 in the bright region B1-G display a green color, and all pixels 2122 in the bright region B1-B display a blue color. In this way, the resolutions of the images provided by the LCD module 210 and the self-luminous display module 220 are consistent and evenly distributed, such that the user cannot identify the difference between the display effects of the LCD module 210 and the self-luminous display module 220.

In the embodiment, the optical parameters of the LCD module 210 and the optical parameters of the self-luminous display module 220 respectively include a maximum display light intensity, the control unit 110 adjusts (decreases or increases) a light intensity of at least one of the LCD module 210 and the self-luminous display module 220, such that the maximum display light intensity of the LCD module 210 is substantially equal to the maximum display light intensity of the self-luminous display module 220. For example, when the self-luminous display module 220 is an LED display module, since it has a higher luminance than that of the LCD module 210, in order to make the display effects of the LCD module 210 and the self-luminous display module 220 to be consistent, the maximum display light intensity of the self-luminous display module 220 can be decreased.

Figure 4:
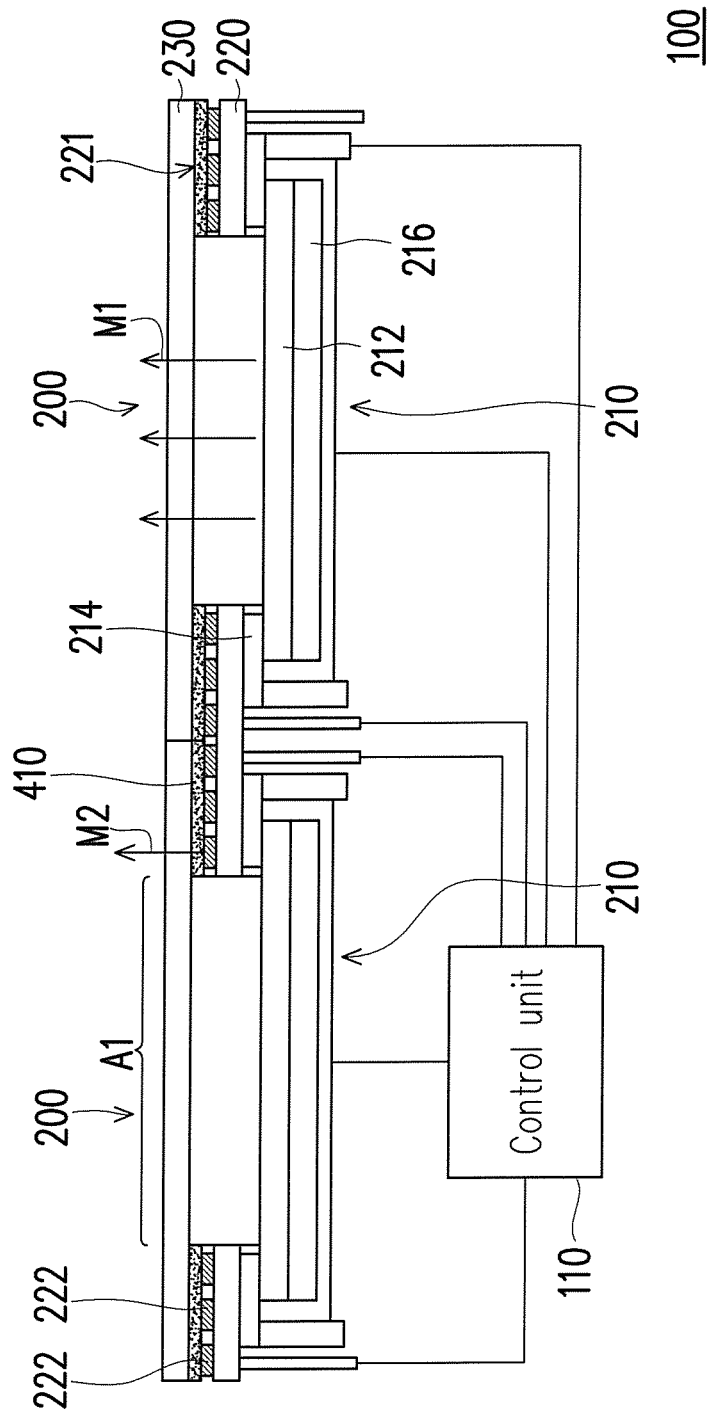
FIG. 4 is a cross-sectional view of a display apparatus according to another embodiment of the invention.

A method for decreasing the maximum display light intensity of the self-luminous display module 220 is, for example, to decrease a current or voltage of the LEDs in the self-luminous display module 220, so as to decrease the display light intensity of the self-luminous display module 220, though the invention is not limited thereto. In other embodiments, as shown in FIG. 4, a light-shielding plate 410 is disposed on the self-luminous display module 220, so as to decrease the maximum display light intensity of the self-luminous display module 220. The light-shielding plate 410 is, for example, a polarizer or a filter, which is configured to reflect or filter a part of image beam M2 emitted by the self-luminous display module 220.

In the embodiment, the optical parameters of the LCD module 210 and the optical parameters of the self-luminous display module 220 respectively include a color gamut, and the control unit 110 adjusts (for example, decreases) the color gamut of at least one of the LCD module 210 and the self-luminous display module 220, such that the color gamut of the LCD module 210 is substantially equal to the color gamut of the self-luminous display module 220. The color gamut refers to that a CIE 1931 XYZ color space, a RGB color space, an Adobe RGB color space, an sRGB color space or national television system committee (NTSC) is used for representing color, though the invention is not limited thereto. The larger the range is, the wider range the displayed color is, and the more vivid the presented color is.

In the embodiment, an original color gamut of the self-luminous display module 220 (for example, the LED display module) is greater than an original color gamut of the LCD module 210, and the control unit 110 decreases the color gamut of the self-luminous display module 220. Referring to related descriptions of FIG. 1C, the self-luminous display module 220 includes a plurality of pixels arranged in an array, each pixel includes a light-emitting unit 222 having a different color (for example, red, green, blue). Each of the light-emitting units 222 is, for example, an LED formed by packaging a red light-emitting chip, a green light-emitting chip, and a blue light-emitting chip. The control unit 110 decreases the color gamut of the self-luminous display module 220 by increasing a gray level of a color value of at least one color other than that with a color value corresponding to a maximum gray level in each of the pixels.

For example, when the self-luminous display module 220 originally displays a pure red color, a luminance of a red value in each pixel is 100%, a luminance of a green value is 0%, and a luminance of a blue value is 0%. After decreasing the color gamut, when the self-luminous display module 220 displays the pure red color, the luminance of the red value in each pixel is 100%, the luminance of the green value is 12%, and the luminance of the blue value is 7%. When the self-luminous display module 220 originally displays a pure green color, the luminance of the red value in each pixel is 0%, the luminance of the green value is 100%, and the luminance of the blue value is 0%. After decreasing the color gamut, when the self-luminous display module 220 displays the pure green color, the luminance of the red value in each pixel is 13%, the luminance of the green value is 100%, and the luminance of the blue value is 9%. When the self-luminous display module 220 originally displays a pure blue color, the luminance of the red value in each pixel is 0%, the luminance of the green value is 0%, and the luminance of the blue value is 100%. After decreasing the color gamut, when the self-luminous display module 220 displays the pure blue color, the luminance of the red value in each pixel is 3%, the luminance of the green value is 4%, and the luminance of the blue value is 100%. In this way, the effect of decreasing the color gamut is achieved, and the color gamut of the self-luminous display module 220 is consistent with the color gamut of the LCD module 210. Alternatively, in other embodiments, referring to related description of FIG. 3, the self-luminous display module 220 includes a plurality of pixels arranged in an array, and each pixel includes a plurality of light-emitting units 222 of different colors (for example, red, green, blue). The light-emitting units 222, for example, include a red LED, a green LED, and a blue LED. The control unit 110 decreases the color gamut of the self-luminous display module 220 by increasing a gray level of the light-emitting unit 222 of at least one color other than that of the light-emitting unit 222 with a maximum gray level in each of the pixels. The adjusting method is similar as that described above, and detail thereof is not repeated.

When the display units 200 are connected to form the display apparatus 100, the control unit 110 is electrically connected to the LCD modules 210 and the self-luminous display modules 220 of the display units 200, and is configured to match the optical parameters (e.g., make the optical parameters to be consistent) of the display units 200. In this way, the user is not liable to perceive the spliced images, but regards the spliced images as a continuous large image.

In the display apparatus 100 of the embodiment, since the control unit 110 matches the optical parameters of the LCD module 210 with the optical parameters of the self-luminous display module 220, the display effect of the LCD module 210 is close to the display effect of the self-luminous display module 220. Therefore, the user is not liable to perceive existence of two different display modules, and regards the displayed image as a continuous and complete image.

Figure 5:
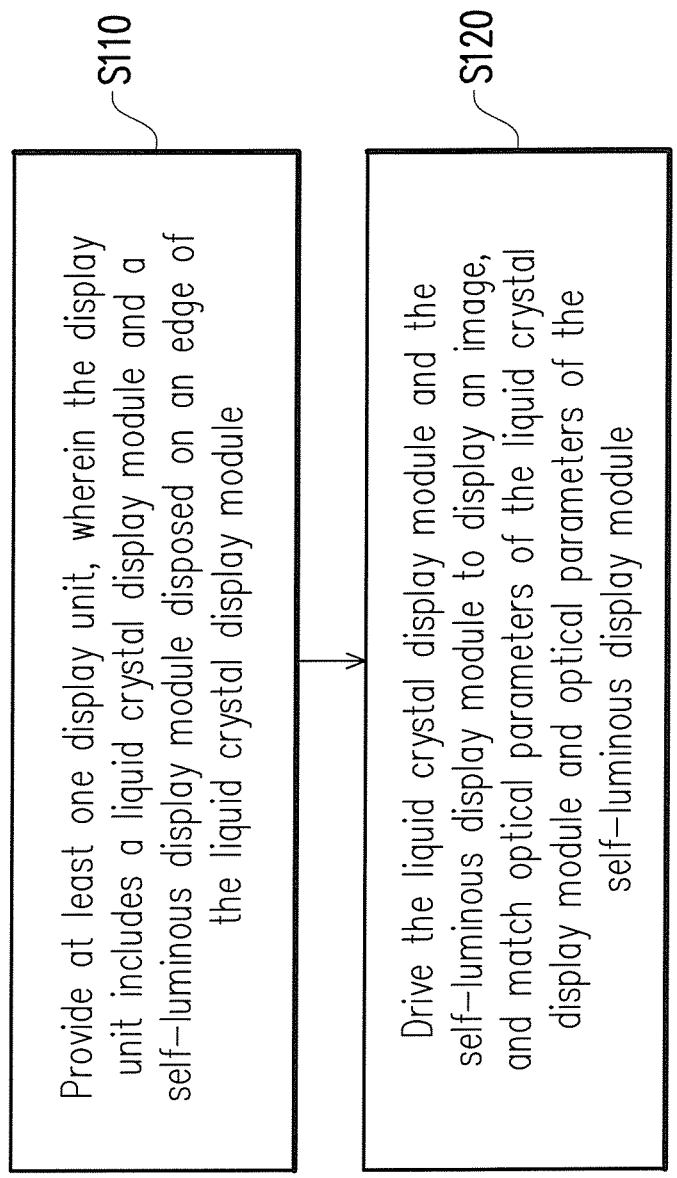
FIG. 5 is a flowchart illustrating a display method according to an embodiment of the invention.

FIG. 5 is a flowchart illustrating a display method according to an embodiment of the invention. Referring to FIG. 1A and FIG. 5, the display method of the embodiment is adapted to the display apparatus of the above embodiments, and the display apparatus 100 of FIG. 1A is taken as an example for description. In the embodiment, the display method includes following steps. At least one display unit 200 is provided (step S110), the LCD module 210 and the self-luminous display module 220 are driven to display an image, and optical parameters of the LCD module 210 and optical parameters of the self-luminous display module 220 are matched (step S120). The method for matching the optical parameters of the LCD module 210 and optical parameters of the self-luminous display module 220 has been described in the aforementioned descriptions, and detail thereof is not repeated.

In the display method of the embodiment, since the optical parameters of the LCD module 210 and the optical parameters of the self-luminous display module 220 are matched, the display effect of the LCD module 210 is close to the display effect of the self-luminous display module 220. Therefore, the user is not liable to perceive existence of two different display modules, and regards the displayed image as a continuous and complete image.

In summary, the embodiments of the invention have at least one of the following advantages and effects. In the display apparatus and the display method according to the embodiments of the invention, since a design of disposing the self-luminous display module on the edge of the LCD module is adopted, the edge region of the LCD module is effectively used for displaying, and the characteristic of the LCD module is maintained. Moreover, since the optical parameters of the LCD module and the optical parameters of the self-luminous display module are matched, the display effect of the LCD module is close to the display effect of the self-luminous display module, such that the display effects of the LCD module and the self-luminous display module are matched.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all teams are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A display apparatus, comprising:
   at least one display unit, comprising:
      a liquid crystal display module; and
      a self-luminous display module, disposed on an edge of the liquid crystal display module; and
   a control unit, electrically connected to the liquid crystal display module and the self-luminous display module, and configured to match optical parameters of the liquid crystal display module with optical parameters of the self-luminous display module, wherein the self-luminous display module is not capable of providing light to the liquid crystal display module when the self-luminous display module is turned on,
   wherein the self-luminous display module comprises a plurality of light-emitting units arranged in an array, and the control unit turns on a part of pixels of the liquid crystal display module to form a plurality of bright regions arranged in an array and separated from each other,
   wherein a pitch of the bright regions is substantially equal to a pitch of the light-emitting units, the pitch of the bright regions is an interval between any two centers of adjacent bright regions, and the pitch of the light-emitting units is an interval between any two centers of adjacent light-emitting units.

2. The display apparatus of claim 1, wherein the optical parameters of the liquid crystal display module and the optical parameters of the self-luminous display module respectively comprise a position and a size of a light-emitting region, and the control unit turns off the other part of the pixels of the liquid crystal display module to form a dark region.

3. The display apparatus of claim 2, wherein each of the light-emitting units is a light-emitting diode.

4. The display apparatus of claim 2, wherein each of the bright regions is composed of a plurality of turned-on pixels in the liquid crystal display module, and a width of the light-emitting region of each of the light-emitting units is substantially equal to a width of each of the bright regions.

5. The display apparatus of claim 2, wherein a width of the dark region between any two adjacent bright regions is substantially equal to an interval between any two adjacent light-emitting units.

6. The display apparatus of claim 2, wherein an interval between a bright region and a light-emitting unit adjacent to each other along a direction parallel to a display surface of the liquid crystal display module is substantially equal to an interval between two adjacent light-emitting units, and is substantially equal to an interval between two adjacent bright regions.

7. The display apparatus of claim 1, wherein the optical parameters of the liquid crystal display module and the optical parameters of the self-luminous display module respectively comprise a maximum display light intensity, and the control unit adjusts a light intensity of at least one of the liquid crystal display module and the self-luminous display module, such that the maximum display light intensity of the liquid crystal display module is substantially equal to the maximum display light intensity of the self-luminous display module.

8. The display apparatus of claim 1, wherein the optical parameters of the liquid crystal display module and the optical parameters of the self-luminous display module respectively comprise a color gamut, and the control unit adjusts the color gamut of at least one of the liquid crystal display module and the self-luminous display module, such that the color gamut of the liquid crystal display module is substantially equal to the color gamut of the self-luminous display module.

9. The display apparatus of claim 8, wherein an original color gamut of the self-luminous display module is greater than an original color gamut of the liquid crystal display module, the control unit decreases the color gamut of the self-luminous display module, the self-luminous display module comprises a plurality of pixels arranged in an array, each of the pixels comprises a light-emitting unit having a different color, and the control unit decreases the color gamut of the self-luminous display module by increasing a gray level of a color value of at least one color other than that with a color value corresponding to a maximum gray level in each of the pixels.

10. The display apparatus of claim 8, wherein an original color gamut of the self-luminous display module is greater than an original color gamut of the liquid crystal display module, the control unit decreases the color gamut of the self-luminous display module, and the self-luminous display module comprises a plurality of pixels arranged in an array, each of the pixels comprises a plurality of light-emitting units of different colors, and the control unit decreases the color gamut of the self-luminous display module by increasing a gray level of the light-emitting unit of at least one color other than that of the light-emitting unit with a maximum gray level in each of the pixels.

11. The display apparatus of claim 1, wherein the liquid crystal display module comprises:
a liquid crystal display panel; and
a frame, covering an edge of the liquid crystal display panel, wherein the self-luminous display module is disposed on the frame.

12. The display apparatus of claim 1, wherein the self-luminous display module comprises a plurality of light-emitting diodes arranged in an array.

13. The display apparatus of claim 1, wherein the at least one display unit comprises a plurality of display units, and the display units are spliced into the display apparatus, and the self-luminous display modules of any two adjacent display units are connected to each other.

14. The display apparatus of claim 13, wherein the control unit is configured to match optical parameters of the display units.

15. The display apparatus of claim 1, wherein the self-luminous display module covers the edge of the liquid crystal display module, and surrounds a display region of the liquid crystal display module.

16. The display apparatus of claim 1, wherein the maximum display light intensity of the liquid crystal display module is smaller than the maximum display light intensity of the self-luminous display module, and the display unit further comprises a light-shielding plate disposed on the self-luminous display module, so as to decrease the maximum display light intensity of the self-luminous display module.

17. A display method, comprising:
providing at least one display unit, wherein the display unit comprises a liquid crystal display module and a self-luminous display module disposed on an edge of the liquid crystal display module; and
driving the liquid crystal display module and the self-luminous display module to display an image, and matching optical parameters of the liquid crystal display module and optical parameters of the self-luminous display module, wherein the self-luminous display module is not capable of providing light to the liquid crystal display module when the self-luminous display module is turned on,
wherein the self-luminous display module comprises a plurality of light-emitting units arranged in an array, and the step of matching the optical parameters of the liquid crystal display module and the optical parameters of the self-luminous display module comprises turning on a part of pixels of the liquid crystal display module to form a plurality of bright regions arranged in an array and separated from each other,
wherein a pitch of the bright regions is substantially equal to a pitch of the light-emitting units, the pitch of the bright regions is an interval between any two centers of adjacent bright regions, and the pitch of the light-emitting units is an interval between any two centers of adjacent light-emitting units.

18. The display method of claim 17, wherein the optical parameters of the liquid crystal display module and the optical parameters of the self-luminous display module respectively comprise a position and a size of a light-emitting region, and the step of matching the optical parameters of the liquid crystal display module and the optical parameters of the self-luminous display module further comprises:
turning off the other part of the pixels of the liquid crystal display module to form a dark region.

19. The display method of claim 18, wherein each of the bright regions is composed of a plurality of turned-on pixels in the liquid crystal display module, and a width of the light-emitting region of each of the light-emitting units is substantially equal to a width of each of the bright regions.

20. The display method of claim 18, wherein a width of the dark region between any two adjacent bright regions is substantially equal to an interval between any two adjacent light-emitting units.

21. The display method of claim 18, wherein an interval between a bright region and a light-emitting unit adjacent to each other along a direction parallel to a display surface of the liquid crystal display module is substantially equal to an interval between two adjacent light-emitting units, and is substantially equal to an interval between two adjacent bright regions.

22. The display method of claim 17, wherein the optical parameters of the liquid crystal display module and the optical parameters of the self-luminous display module respectively comprise a maximum display light intensity, and the step of matching the optical parameters of the liquid crystal display module and the optical parameters of the self-luminous display module comprises:
adjusting a light intensity of at least one of the liquid crystal display module and the self-luminous display module, such that the maximum display light intensity of the liquid crystal display module is substantially equal to the maximum display light intensity of the self-luminous display module.

23. The display method of claim 17, wherein the optical parameters of the liquid crystal display module and the optical parameters of the self-luminous display module respectively comprise a color gamut, and the step of matching the optical parameters of the liquid crystal display module and the optical parameters of the self-luminous display module comprises:
adjusting the color gamut of at least one of the liquid crystal display module and the self-luminous display module, such that the color gamut of the liquid crystal display module is substantially equal to the color gamut of the self-luminous display module.

24. The display method of claim 23, wherein an original color gamut of the self-luminous display module is greater than an original color gamut of the liquid crystal display module, the self-luminous display module comprises a plurality of pixels arranged in an array, each of the pixels comprises a light-emitting unit having a different color, and the step of decreasing the color gamut of at least one of the liquid crystal display module and the self-luminous display module comprises:

increasing a gray level of a color value of at least one color other than that with a color value corresponding to a maximum gray level in each of the pixels, so as to decrease the color gamut of the self-luminous display module.

25. The display method of claim 23, wherein an original color gamut of the self-luminous display module is greater than an original color gamut of the liquid crystal display module, the self-luminous display module comprises a plurality of pixels arranged in an array, and each of the pixels comprises a plurality of light-emitting units of different colors, and the step of decreasing the color gamut of at least one of the liquid crystal display module and the self-luminous display module comprises:

increasing a gray level of the light-emitting unit of at least one color other than that of the light-emitting unit with a maximum gray level in each of the pixels, so as to decrease the color gamut of the self-luminous display module.

26. The display method of claim 17, wherein the at least one display unit comprises a plurality of display units, and the display method comprises:

splicing the display units into a display apparatus, and making the self-luminous display modules of any two adjacent display units connect each other.

27. The display method of claim 26, further comprising: matching optical parameters of the display units.

28. The display method of claim 17, wherein the maximum display light intensity of the liquid crystal display module is smaller than the maximum display light intensity of the self-luminous display module, and the display method further comprises:

disposing a light-shielding plate on the self-luminous display module to decrease the maximum display light intensity of the self-luminous display module.

* * * * *